US012267665B2

(12) United States Patent
Laaksonen et al.

(10) Patent No.: US 12,267,665 B2
(45) **Date of Patent: *Apr. 1, 2025**

(54) SPATIAL AUDIO AUGMENTATION

(71) Applicant: Nokia Technologies Oy, Espoo (FI)

(72) Inventors: Lasse Laaksonen, Tampere (FI); Antti Eronen, Tampere (FI); Kari Juhani Jarvinen, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 18/224,194

(22) Filed: Jul. 20, 2023

(65) Prior Publication Data

US 2023/0370803 A1 Nov. 16, 2023

Related U.S. Application Data

(63) Continuation of application No. 17/258,769, filed as application No. PCT/FI2019/050533 on Jul. 5, 2019, now Pat. No. 11,758,349.

(30) Foreign Application Priority Data

Jul. 13, 2018 (GB) ...................................... 1811546

(51) Int. Cl.
*H04S 7/00* (2006.01)
*G10L 19/008* (2013.01)

(52) U.S. Cl.
CPC ............ *H04S 7/304* (2013.01); *G10L 19/008* (2013.01); *H04S 2400/01* (2013.01); *H04S 2420/03* (2013.01); *H04S 2420/11* (2013.01)

(58) Field of Classification Search
CPC . G10L 19/008; G10L 19/167; H04S 2420/01; H04S 3/02; H04S 2420/03; H04S 7/303
(Continued)

(56) References Cited

U.S. PATENT DOCUMENTS 6,215,789 B1 * 4/2001 Keenan ............... H04L 47/2416 370/399
9,749,738 B1 8/2017 Adsumilli et al.
(Continued)

FOREIGN PATENT DOCUMENTS

CN 1018431114 A 9/2010
WO WO-2017/132396 A1 8/2017

OTHER PUBLICATIONS

Anonymous: "Draft MPEG-I Audio Requirements" 123. MPEG Meeting; Jul. 16, 2018-Jul. 20, 2018; Ljubljana; (Motion Picture Expert Group or ISO/IEC JTC1/SC29/WG11), Jul. 20, 2018 (Jul. 20, 2018), XP030197587.

(Continued)

*Primary Examiner* — Alexander Krzystan
(74) *Attorney, Agent, or Firm* — McCarter & English, LLP

(57) ABSTRACT

An apparatus configured to: obtain at least one spatial audio signal, the at least one spatial audio signal comprising at least one audio signal and at least one spatial parameter; determine at least one first audio signal based, at least partially, on the at least one spatial audio signal and the at least one of the user position or orientation; obtain at least one augmentation audio signal, wherein the at least one augmentation audio signal has a different audio format than an audio format of the at least one spatial audio signal, wherein the at least one augmentation audio signal provides a different type of media content; determine at least one second audio signal based, at least partially, on at least a part of the at least one augmentation audio signal; and mix the at least one first audio signal and the at least one second audio signal.

20 Claims, 9 Drawing Sheets

(58) Field of Classification Search
USPC ............................ 381/310, 309, 306, 22, 23
See application file for complete search history.

(56) References Cited

U.S. PATENT DOCUMENTS

| | | | | |
|---|---|---|---|---|
| 11,216,086 | B2 * | 1/2022 | Wan | G06T 7/70 |
| 11,263,438 | B2 * | 3/2022 | Kaehler | G06V 40/171 |
| 11,275,433 | B2 * | 3/2022 | Wedig | G06T 13/40 |
| 11,533,531 | B1 | 12/2022 | Link | |
| 2004/0146170 | A1 | 7/2004 | Zint | |
| 2006/0287748 | A1 | 12/2006 | Layton et al. | |
| 2009/0059958 | A1 | 3/2009 | Nakata | |
| 2013/0236040 | A1 | 9/2013 | Crawford et al. | |
| 2015/0371645 | A1 | 12/2015 | Seo et al. | |
| 2015/0373474 | A1 | 12/2015 | Kraft et al. | |
| 2016/0088417 | A1 | 3/2016 | Kim et al. | |
| 2017/0208415 | A1 | 7/2017 | Ojala | |
| 2017/0354196 | A1 | 12/2017 | Tammam et al. | |
| 2018/0098173 | A1 | 4/2018 | Van Brandenburg et al. | |
| 2018/0139566 | A1 | 5/2018 | Crum | |
| 2018/0146316 | A1 | 5/2018 | Laaksonen et al. | |
| 2018/0270144 | A1 * | 9/2018 | Jiang | H04L 45/123 |
| 2019/0387168 | A1 | 12/2019 | Smith et al. | |
| 2020/0368616 | A1 | 11/2020 | Van Weeren | |
| 2021/0041220 | A1 * | 2/2021 | Van Weeren | G01B 11/002 |
| 2021/0127224 | A1 * | 4/2021 | Laaksonen | H04S 7/304 |
| 2023/0139901 | A1 * | 5/2023 | Schmidt | H04S 3/008 381/22 |

OTHER PUBLICATIONS

Herre Jurgen et al. "Parametric Coding of Audio Objects: Technology, Performance and Opportunities", Conference: 42nd International Conference: Semantic Audio; Jul. 2011, AES, 60 East 42nd Street, Room 2520 New York 10165-2520, USA, Jul. 22, 2011 (Jul. 22, 2011), XP040567517.

Davide A. Mauro et al. "Binaural Spatialization for 3D Immersive Audio Communication in a Virtual World", Sep. 18, 2013; 1077952576-1077952576, Sep. 18, 2013 (Sep. 18, 2013), pp. 1-8, XP058044594, DOI: 10.1145/2544114.2544115.

"Open AL" Wikipedia, 5 pages.

* cited by examiner

SPATIAL AUDIO AUGMENTATION

RELATED APPLICATIONS

This application is a continuation of U.S. patent application Ser. No. 17/258,769, filed Jan. 8, 2021, which is a National Stage Entry of International Application No. PCT/FI2019/050533, filed Jul. 5, 2019. Both applications are hereby incorporated by reference in their entirety, and claim priority to GB 1811546.9 filed Jul. 13, 2018.

FIELD

The present application relates to apparatus and methods for spatial audio augmentation, but not exclusively for spatial audio augmentation within an audio decoder.

BACKGROUND

Immersive audio codecs are being implemented supporting a multitude of operating points ranging from a low bit rate operation to transparency. An example of such a codec is the immersive voice and audio services (IVAS) codec which is being designed to be suitable for use over a communications network such as a 3GPP 4G/5G network. Such immersive services include uses for example in immersive voice and audio for virtual reality (VR). This audio codec is expected to handle the encoding, decoding and rendering of speech, music and generic audio. It is furthermore expected to support channel-based audio and scene-based audio inputs including spatial information about the sound field and sound sources. The codec is also expected to operate with low latency to enable conversational services as well as support high error robustness under various transmission conditions.

Furthermore parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. Additional parameters can describe for example the properties of the non-directional parts, such as their various coherence properties. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

6 degree of freedom (6DoF) content capture and rendering is an example of an implemented augmented reality (AR)/virtual reality (VR) application. This for example may be where a content consuming user is permitted to both move in a rotational manner and a translational manner to explore their environment. Rotational movement is sufficient for a simple VR experience where the user may turn her head (pitch, yaw, and roll) to experience the space from a static point or along an automatically moving trajectory. Translational movement means that the user may also change the position of the rendering, i.e., move along the x, y, and z axes according to their wishes. As well as 6 degree of freedom systems there are other degrees of freedom system and the related experiences using the terms 3 degrees of freedom 3DoF which cover only the rotational movement and 3DoF+ which falls somewhat between 3DoF and 6DoF and allows for some limited user movement (in other words it can be considered to implement a restricted 6DoF where the user is for example sitting down but can lean their head in various directions).

SUMMARY

There is provided according to a first aspect an apparatus comprising means for: obtaining at least one spatial audio signal which can be rendered consistent with a content consumer user movement, the at least one spatial audio signal comprising at least one audio signal and at least one spatial parameter associated with the at least one audio signal, wherein the at least one audio signal defines an audio scene; rendering the at least one spatial audio signal to be at least partially consistent with a content consumer user movement and obtain at least one first rendered audio signal; obtaining at least one augmentation audio signal; rendering at least a part of the at least one augmentation audio signal to obtain at least one augmentation rendered audio signal; mixing the at least one first rendered audio signal and the at least one augmentation rendered audio signal to generate at least one output audio signal.

The means for obtaining at least one spatial audio signal may be means for decoding from a first bit stream the at least one spatial audio signal and the at least one spatial parameter.

The first bit stream may be a MPEG-I audio bit stream.

The means for obtaining at least one augmentation audio signal may be further for decoding from a second bit stream the at least one augmentation audio signal.

The second bit stream may be a low-delay path bit stream.

The means for may be further for: obtaining a mapping from a spatial part of the at least one augmentation audio signal to the audio scene; and controlling the mixing of at least one first rendered audio signal and the at least one augmentation rendered audio signal based on the mapping.

The means for controlling the mixing of the at least one first rendered audio signal and the at least one augmentation rendered audio signal may be further for: determining a mixing mode for the mixing of the at least one first rendered audio signal and the at least one augmentation rendered audio signal.

The mixing mode for the at least one first rendered audio signal and the at least one augmentation rendered audio signal may be at least one of: a world-locked mixing wherein an audio object associated with the at least one augmentation audio signal is fixed as a position within the audio scene; and an object-locked mixing wherein an audio object associated with the at least one augmentation audio signal is fixed relative to a content consumer user position and/or rotation within the audio scene.

The means for controlling the mixing of at least one first rendered audio signal and the at least one augmentation rendered audio signal may be further for: determining a gain based on a content consumer user position and/or rotation and a position associated with an audio object associated with the at least one augmentation audio signal; and applying the gain to the at least one augmentation rendered audio signal before mixing the at least one first rendered audio signal and the at least one augmentation rendered audio signal.

The means for obtaining a mapping from a spatial part of the at least one augmentation audio signal to the audio scene may be further for at least one of: decoding metadata related to the mapping from a spatial part of the at least one augmentation audio signal to the audio scene from the at least one augmentation audio signal; and obtaining the mapping from a spatial part of the at least one augmentation audio signal to the audio scene from a user input.

The audio scene may be a six degrees of freedom scene.

The spatial part of the at least one augmentation audio signal may define one of: a three degrees of freedom scene; and a three degrees of rotational freedom with limited translational freedom scene.

According to a second aspect there is provided a method comprising: obtaining at least one spatial audio signal which can be rendered consistent with a content consumer user movement, the at least one spatial audio signal comprising at least one audio signal and at least one spatial parameter associated with the at least one audio signal, wherein the at least one audio signal defines an audio scene; rendering the at least one spatial audio signal to be at least partially consistent with a content consumer user movement and obtain at least one first rendered audio signal; obtaining at least one augmentation audio signal; rendering at least a part of the at least one augmentation audio signal to obtain at least one augmentation rendered audio signal; mixing the at least one first rendered audio signal and the at least one augmentation rendered audio signal to generate at least one output audio signal.

Obtaining at least one spatial audio signal may comprise decoding from a first bit stream the at least one spatial audio signal and the at least one spatial parameter.

The first bit stream may be a MPEG-I audio bit stream.

Obtaining at least one augmentation audio signal may comprise decoding from a second bit stream the at least one augmentation audio signal.

The second bit stream may be a low-delay path bit stream.

The method may comprise: obtaining a mapping from a spatial part of the at least one augmentation audio signal to the audio scene; and controlling the mixing of at least one first rendered audio signal and the at least one augmentation rendered audio signal based on the mapping.

Controlling the mixing of the at least one first rendered audio signal and the at least one augmentation rendered audio signal may comprise: determining a mixing mode for the mixing of the at least one first rendered audio signal and the at least one augmentation rendered audio signal.

The mixing mode for the at least one first rendered audio signal and the at least one augmentation rendered audio signal may be at least one of: a world-locked mixing wherein an audio object associated with the at least one augmentation audio signal is fixed as a position within the audio scene; and an object-locked mixing wherein an audio object associated with the at least one augmentation audio signal is fixed relative to a content consumer user position and/or rotation within the audio scene.

Controlling the mixing of at least one first rendered audio signal and the at least one augmentation rendered audio signal may comprise: determining a gain based on a content consumer user position and/or rotation and a position associated with an audio object associated with the at least one augmentation audio signal; and applying the gain to the at least one augmentation rendered audio signal before mixing the at least one first rendered audio signal and the at least one augmentation rendered audio signal.

Obtaining a mapping from a spatial part of the at least one augmentation audio signal to the audio scene may further comprise at least one of: decoding metadata related to the mapping from a spatial part of the at least one augmentation audio signal to the audio scene from the at least one augmentation audio signal; and obtaining the mapping from a spatial part of the at least one augmentation audio signal to the audio scene from a user input.

The audio scene may be a six degrees of freedom scene.

The spatial part of the at least one augmentation audio signal may define one of: a three degrees of freedom scene; and a three degrees of rotational freedom with limited translational freedom scene.

According to a third aspect there is provided an apparatus comprising at least one processor and at least one memory including a computer program code, the at least one memory and the computer program code configured to, with the at least one processor, cause the apparatus at least to: obtain at least one spatial audio signal which can be rendered consistent with a content consumer user movement, the at least one spatial audio signal comprising at least one audio signal and at least one spatial parameter associated with the at least one audio signal, wherein the at least one audio signal defines an audio scene; render the at least one spatial audio signal to be at least partially consistent with a content consumer user movement and obtain at least one first rendered audio signal; obtain at least one augmentation audio signal; render at least a part of the at least one augmentation audio signal to obtain at least one augmentation rendered audio signal; mix the at least one first rendered audio signal and the at least one augmentation rendered audio signal to generate at least one output audio signal.

The apparatus caused to obtain at least one spatial audio signal may be cause to decode from a first bit stream the at least one spatial audio signal and the at least one spatial parameter.

The first bit stream may be a MPEG-I audio bit stream.

The apparatus caused to obtain at least one augmentation audio signal may be caused to decode from a second bit stream the at least one augmentation audio signal.

The second bit stream may be a low-delay path bit stream.

The apparatus may further be caused to: obtain a mapping from a spatial part of the at least one augmentation audio signal to the audio scene; and control the mixing of at least one first rendered audio signal and the at least one augmentation rendered audio signal based on the mapping.

The apparatus caused to control the mixing of the at least one first rendered audio signal and the at least one augmentation rendered audio signal may be caused to: determine a mixing mode for the mixing of the at least one first rendered audio signal and the at least one augmentation rendered audio signal.

The mixing mode for the at least one first rendered audio signal and the at least one augmentation rendered audio signal may be at least one of: a world-locked mixing wherein an audio object associated with the at least one augmentation audio signal is fixed as a position within the audio scene; and an object-locked mixing wherein an audio object associated with the at least one augmentation audio signal is fixed relative to a content consumer user position and/or rotation within the audio scene.

The apparatus caused to control the mixing of at least one first rendered audio signal and the at least one augmentation rendered audio signal may be caused to: determine a gain based on a content consumer user position and/or rotation and a position associated with an audio object associated with the at least one augmentation audio signal; and apply the gain to the at least one augmentation rendered audio signal before mixing the at least one first rendered audio signal and the at least one augmentation rendered audio signal.

The apparatus caused to obtain a mapping from a spatial part of the at least one augmentation audio signal to the audio scene may be caused to perform at least one of: decode metadata related to the mapping from a spatial part of the at least one augmentation audio signal to the audio scene from the at least one augmentation audio signal; and obtain the mapping from a spatial part of the at least one augmentation audio signal to the audio scene from a user input.

The audio scene may be a six degrees of freedom scene.

The spatial part of the at least one augmentation audio signal may define one of: a three degrees of freedom scene; and a three degrees of rotational freedom with limited translational freedom scene.

According to a fourth aspect there is provided a computer program comprising instructions [or a computer readable medium comprising program instructions] for causing an apparatus to perform at least the following: obtaining at least one spatial audio signal which can be rendered consistent with a content consumer user movement, the at least one spatial audio signal comprising at least one audio signal and at least one spatial parameter associated with the at least one audio signal, wherein the at least one audio signal defines an audio scene; rendering the at least one spatial audio signal to be at least partially consistent with a content consumer user movement and obtain at least one first rendered audio signal; obtaining at least one augmentation audio signal; rendering at least a part of the at least one augmentation audio signal to obtain at least one augmentation rendered audio signal; mixing the at least one first rendered audio signal and the at least one augmentation rendered audio signal to generate at least one output audio signal.

According to a fifth aspect there is provided a non-transitory computer readable medium comprising program instructions for causing an apparatus to perform at least the following: obtaining at least one spatial audio signal which can be rendered consistent with a content consumer user movement, the at least one spatial audio signal comprising at least one audio signal and at least one spatial parameter associated with the at least one audio signal, wherein the at least one audio signal defines an audio scene; rendering the at least one spatial audio signal to be at least partially consistent with a content consumer user movement and obtain at least one first rendered audio signal; obtaining at least one augmentation audio signal; rendering at least a part of the at least one augmentation audio signal to obtain at least one augmentation rendered audio signal; mixing the at least one first rendered audio signal and the at least one augmentation rendered audio signal to generate at least one output audio signal.

According to an sixth aspect there is provided an apparatus comprising: obtaining circuitry configured to obtain at least one spatial audio signal which can be rendered consistent with a content consumer user movement, the at least one spatial audio signal comprising at least one audio signal and at least one spatial parameter associated with the at least one audio signal, wherein the at least one audio signal defines an audio scene; rendering circuitry configured to render the at least one spatial audio signal to be at least partially consistent with a content consumer user movement and obtain at least one first rendered audio signal; further obtaining circuitry configured to obtain at least one augmentation audio signal; further rendering circuitry configured to render at least a part of the at least one augmentation audio signal to obtain at least one augmentation rendered audio signal; mixing circuitry configured to mix the at least one first rendered audio signal and the at least one augmentation rendered audio signal to generate at least one output audio signal.

According to a seventh aspect there is provided a computer readable medium comprising program instructions for causing an apparatus to perform at least the following: obtaining at least one spatial audio signal which can be rendered consistent with a content consumer user movement, the at least one spatial audio signal comprising at least one audio signal and at least one spatial parameter associated with the at least one audio signal, wherein the at least one audio signal defines an audio scene; rendering the at least one spatial audio signal to be at least partially consistent with a content consumer user movement and obtain at least one first rendered audio signal; obtaining at least one augmentation audio signal; rendering at least a part of the at least one augmentation audio signal to obtain at least one augmentation rendered audio signal; mixing the at least one first rendered audio signal and the at least one augmentation rendered audio signal to generate at least one output audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
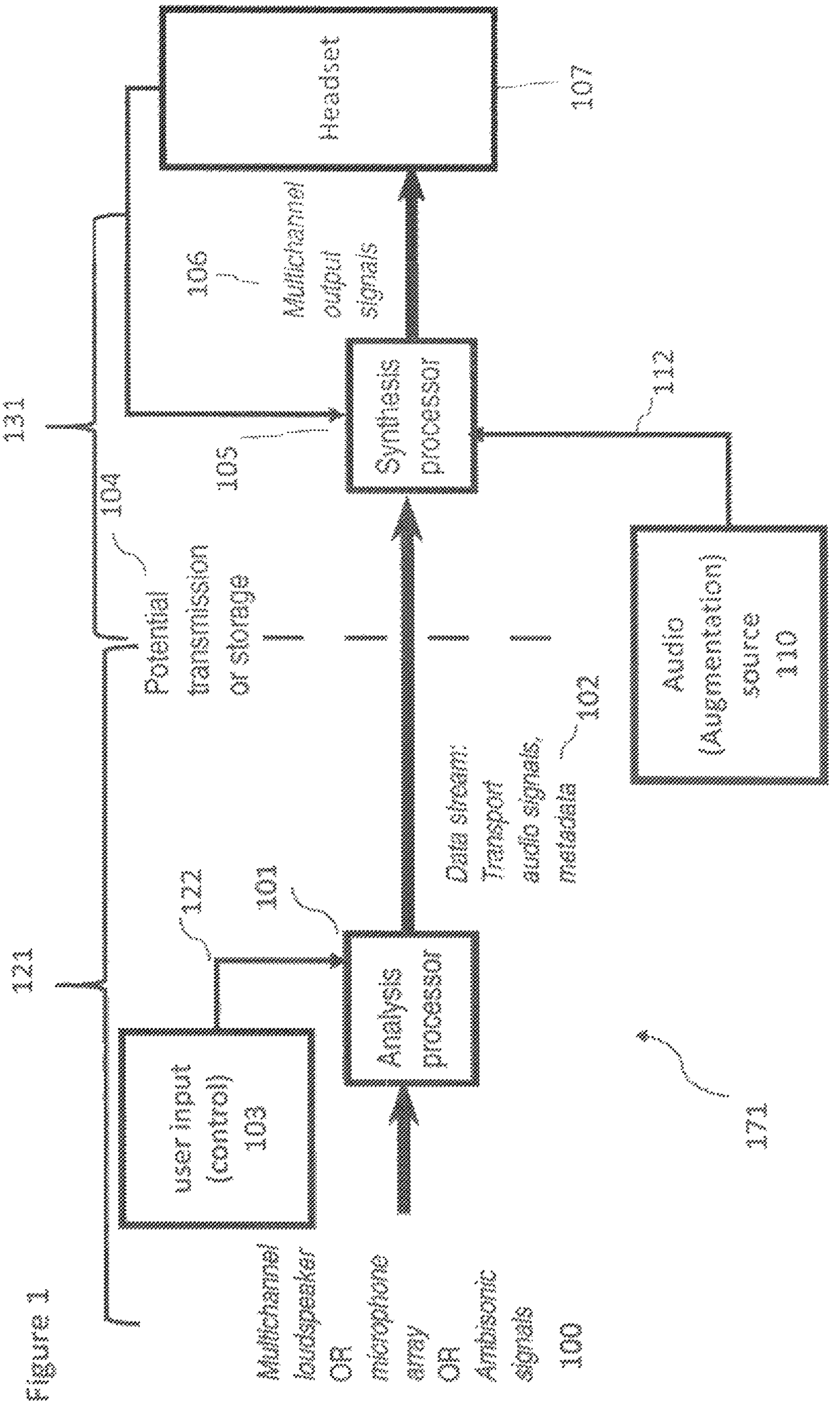
FIG. 1 shows schematically a system of apparatus suitable for implementing some embodiments.

The following describes in further detail suitable apparatus and possible mechanisms for the provision of effective rendering of 3 degree of freedom immersive media content within a 6 degree of freedom scene and produce a quality output.

The concept as discussed in further detail herein is one wherein a suitable audio renderer is able to decode and render audio content from a wide range of audio sources. For example the embodiments as discussed herein are able to combine audio content such that a 6 degree of freedom based spatial audio signal is able to be augmented with an augmentation audio signal comprising augmentation spatial metadata. Furthermore in some embodiments there are apparatus and methods wherein the scene rendering may be augmented with a further (low-delay path) communications or augmentation audio signal input. In some embodiments this apparatus may comprise a suitable audio decoder configured to decode the input audio signals (i.e., using an external decoder) and provided to the renderer in a suitable format (for example a format comprising 'channels, objects, and/or HOA'). In such a manner the apparatus may be configured to provide capability for decoding or rendering of many types of immersive audio. Such audio would be useful for immersive audio augmentation using a low-delay path or other suitable input interface. However, providing the augmentation audio signal in a suitable format may require a format transformation which causes a loss in quality. Therefore this is not optimal for example for a parametric audio representation or any other representation that does not correspond to the formats supported by the main audio renderer (for example a format comprising 'channels, objects, and/or HOA').

To overcome this problem an audio signal (for example from 3GPP IVAS) which is not supported by the spatial audio (6DoF) renderer in native format may be processed and rendered externally in order to allow mixing with audio from the default spatial audio renderer without producing a loss in quality related to format transformations. The augmentation audio signal may thus be provided for example via a low-delay path audio input, rendered using an external renderer, and then mixed with the spatial audio (6DoF) rendering according to an augmentation metadata.

The concept may be implemented in some embodiments by augmenting a 3DoF (or 3DoF+) audio stream over spatial audio (6DoF) based media content in at least a user-locked and world-locked operation mode using a further or external renderer for audio not supported by the spatial audio (6DoF) renderer. The augmentation source may be a communications audio or any other audio provided via an interface suitable for providing 'non-native' audio streams. For example, the spatial audio (6DoF) renderer can be the MPEG-I 6DoF Audio Renderer and the non-native audio stream can be a 3GPP IVAS immersive audio provided via a communications codec/audio interface. The 6DoF media content may in some embodiments be audio-only content, audio-visual content or a visual-only content. The user-locked and the world-locked operation modes relate to user preference signalling or service signalling, which can be provided either as part of the augmentation source (3DoF) metadata, part of local (external) metadata input, or as a combination thereof.

In some embodiments as discussed in further detail herein the apparatus comprises an external or further renderer configured to receive an augmentation (non-native 3DoF) audio format, the further renderer may then be configured to render the augmentation audio according to a user-locked or world-locked mode selected based on a 3DoF-to-6DoF mapping metadata to generate an augmentation or further (3DoF) rendering, apply a gain relative to a user rendering position in 6DoF scene to the augmentation rendering, and mix the augmentation (3DoF) rendering and spatial audio based (6DoF) audio renderings for playback to the content consumer user. The further or augmentation (3DoF) renderer can in some embodiments be implemented as a separate module that can in some embodiments reside on a separate device or several devices. In some embodiments where there is no spatial audio signal (in other words the augmentation audio is augmenting visual-only content, the augmentation (3DoF) audio rendering may be the only output audio.

In some embodiments where the augmentation (3DoF) audio is user-locked, the corresponding immersive audio bubble is rendered with the augmentation (external) renderer, and mixed with a gain corresponding to a volume control to the (binaural or otherwise) output of the spatial audio (for example MPEG-I 6DoF) renderer. In some embodiments, the volume control can be based at least partly on the augmentation (3DoF) audio based metadata and spatial (6DoF) audio based metadata extensions such as a MPEG-H DRC (Dynamic Range Control), Loudness, and Peak Limiter parameter. It is understood that in this context, user-locked relates to a lack of a user translation effect and not a user rotation effect (i.e., the related audio rendering experience is characterized as 3DoF).

In some embodiments where the augmentation (3DoF) audio is world-locked, a distance attenuation gain is determined based on the augmentation-to-spatial audio (3DoF-to-6DoF) mapping metadata and the content consumer user position and rotation information (in addition to any user provided volume control parameter) and may be applied to the 'externally' rendered bubble. This bubble remains user-locked anyway but may be attenuated in gain when the user moves away in the spatial audio (6DoF) content from the position where the augmentation audio immersive bubble has been mapped. According to some embodiments a distance gain attenuation curve (an attenuation distance) can additionally be specified in the metadata. It is thus understood that in this context, world-locked relates to a reference 6DoF position where at least one component of the audio rendering may however follow the user (i.e., the related audio rendering experience is characterized as 3DoF with at least a volume effect based on a 6DoF position).

With respect to FIG. 1 an example apparatus and system for implementing embodiments of the application are shown. The system 171 is shown with a content production 'analysis' part 121 and a content consumption 'synthesis' part 131. The 'analysis' part 121 is the part from receiving a suitable input (for example multichannel loudspeaker, microphone array, ambisonics) audio signals 100 up to an encoding of the metadata and transport signal 102 which may be transmitted or stored 104. The 'synthesis' part 131 may be the part from a decoding of the encoded metadata and transport signal 104, the augmentation of the audio signal and the presentation of the generated signal (for example in multi-channel loudspeaker form 106 via loudspeakers 107.

The input to the system 171 and the 'analysis' part 121 is therefore audio signals 100. These may be suitable input, e.g., multichannel loudspeaker audio signals, microphone array audio signals, audio object signals or ambisonic audio signals. For example, in the case the core audio is carried as MPEG-H 3D audio specified in the ISO/IEC 23008-3 (MPEG-H Part 3), the input can be audio objects (comprising one or more audio channels) and associated metadata, immersive multichannel signals, or Higher Order Ambisonics (HOA) signals.

The input audio signals 100 may be passed to an analysis processor 101. The analysis processor 101 may be configured to receive the input audio signals and generate a suitable data stream 104 comprising suitable transport signals. The transport audio signals may also be known as associated audio signals and be based on the audio signals. For example in some embodiments the transport signal generator 103 is configured to downmix or otherwise select or combine, for example, by beamforming techniques the input audio signals to a determined number of channels and output these as transport signals. In some embodiments the analysis processor is configured to generate a 2 audio channel output of the microphone array audio signals. The determined number of channels may be two or any suitable number of channels. In some embodiments the analysis processor is configured to create HOA Transport Format (HTF) transport signals from the input audio signals representing HOA of a certain order, such as $4^{th}$ order ambisonics. In some embodiments the analysis processor is configured to create transport signals for each of different types of input audio signals, the created transport signals for each of different types of input audio signals differing in their number of channels.

In some embodiments the analysis processor is configured to pass the received input audio signals 100 unprocessed to an encoder in the same manner as the transport signals. In some embodiments the analysis processor 101 is configured to select one or more of the microphone audio signals and output the selection as the transport signals 104. In some embodiments the analysis processor 101 is configured to apply any suitable encoding or quantization to the transport audio signals.

In some embodiments the analysis processor 101 is also configured to analyse the input audio signals 100 to produce metadata associated with the input audio signals (and thus associated with the transport signals). The analysis processor 101 can, for example, be a computer (running suitable software stored on memory and on at least one processor), or alternatively a specific device utilizing, for example, FPGAs or ASICs.

Furthermore in some embodiments a user input (control) 103 may be further configured to supply at least one user input 122 or control input which may be encoded as additional metadata by the analysis processor 101 and then transmitted or stored as part of the metadata associated with the transport audio signals. In some embodiments the user input (control) 103 is configured to either analyse the input signals 100 or be provided with analysis of the input signals 100 from the analysis processor 101 and based on this analysis generate the control input signals 122 or assist the user to provide the control signals.

The transport signals and the metadata 102 may be transmitted or stored. This is shown in FIG. 1 by the dashed line 104. Before the transport signals and the metadata are transmitted or stored they may in some embodiments be coded in order to reduce bit rate, and multiplexed to one stream. The encoding and the multiplexing may be implemented using any suitable scheme.

At the synthesis side 131, the received or retrieved data (stream) may be input to a synthesis processor 105. The synthesis processor 105 may be configured to demultiplex the data (stream) to coded transport and metadata. The synthesis processor 105 may then decode any encoded streams in order to obtain the transport signals and the metadata.

The synthesis processor 105 may then be configured to receive the transport signals and the metadata and create a suitable multi-channel audio signal output 106 (which may be any suitable output format such as binaural, multi-channel loudspeaker or Ambisonics signals, depending on the use case) based on the transport signals and the metadata. In some embodiments with loudspeaker reproduction, an actual physical sound field is reproduced (using headset 107) having the desired perceptual properties. In other embodiments, the reproduction of a sound field may be understood to refer to reproducing perceptual properties of a sound field by other means than reproducing an actual physical sound field in a space. For example, the desired perceptual properties of a sound field can be reproduced over headphones using the binaural reproduction methods as described herein. In another example, the perceptual properties of a sound field could be reproduced as an Ambisonic output signal, and these Ambisonic signals can be reproduced with Ambisonic decoding methods to provide for example a binaural output with the desired perceptual properties.

Furthermore in some embodiments the synthesis side is configured to receive an audio (augmentation) source 110 audio signal 112 for augmenting the generated multi-channel audio signal output. The synthesis processor 105 in such embodiments is configured to receive the augmentation source 110 audio signal 112 and is configured to augment the output signal in a manner controlled by the control metadata as described in further detail herein.

The synthesis processor 105 can in some embodiments be a computer (running suitable software stored on memory and on at least one processor), or alternatively a specific device utilizing, for example, FPGAs or ASICs.

Rendering 6DOF audio for a content consuming user can be done using a headset such as head mounted display and headphones connected to the head mounted display.

The headset may include means for determining the spatial position of the user and/or orientation of the user's head. This may be by means of determining the spatial position and/or orientation of the headset. Over successive time frames, a measure of movement may therefore be calculated and stored. For example, the headset may incorporate motion tracking sensors which may include one or more of gyroscopes, accelerometers and structured light systems. These sensors may generate position data from which a current visual field-of-view (FOV) is determined and updated as the user, and so the headset, changes position and/or orientation. The headset may comprise two digital screens for displaying stereoscopic video images of the virtual world in front of respective eyes of the user, and also a connection for a pair of headphones for delivering audio to the left and right ear of the user.

In some example embodiments, the spatial position and/or orientation of the user's head may be determined using a six degrees of freedom (6DoF) method. These include measurements of pitch, roll and yaw and also translational movement in Euclidean space along side-to-side, front-to-back and up-and-down axes. (The use of a six-degrees of freedom headset is not essential. For example, a three-degrees of freedom headset could readily be used.)

The display system may be configured to display virtual reality or augmented reality content data to the user based on spatial position and/or the orientation of the headset. A detected change in spatial position and/or orientation, i.e. a form of movement, may result in a corresponding change in the visual data to reflect a position or orientation transformation of the user with reference to the space into which the visual data is projected. This allows virtual reality content data to be consumed with the user experiencing a 3D virtual reality or augmented reality environment/scene, consistent with the user movement.

Correspondingly, the detected change in spatial position and/or orientation may result in a corresponding change in the audio data played to the user to reflect a position or orientation transformation of the user with reference to the space where audio data is located. This enables audio content to be rendered consistent with the user movement.

Modifications such as level/gain and position changes are done to audio playback properties of sound objects to correspond to the transformation. For example, when the user rotates his head the positions of sound objects are rotated accordingly to the opposite direction so that, from the perspective of the user, the sound objects appear to remain at a constant position in the virtual world. As another example, when the user walks farther away from an audio object, its gain or amplitude is lowered accordingly inversely proportionally to the distance as would approximately happen in the real world when user walks away from a real, physical sound emitting object. This kind of rendering can be used for implementing 6DOF rendering of the object part of MPEG-I audio, for example. In the case the HOA part and/or channel part of the MPEG-I audio contain only ambiance with no strong directional sounds, the rendering of those portions does not need to take user movement into account as the audio can be rendered in a similar manner at different user positions and/or orientations. In some embodiments, only the head rotation can be taken into account and the HOA and/or channel presentation be rotated accordingly. In a similar manner, modifications to properties of time-frequency tiles such as their direction-of-arrival and amplitude are made when the system is rendering parametric spatial audio comprising transport signals and parametric spatial metadata for time-frequency tiles. In this case, the metadata needs to represent, for example, the DOA, ratio parameter, and the distance so that geometric modifications required by 6DOF rendering can be calculated.

Figure 2:
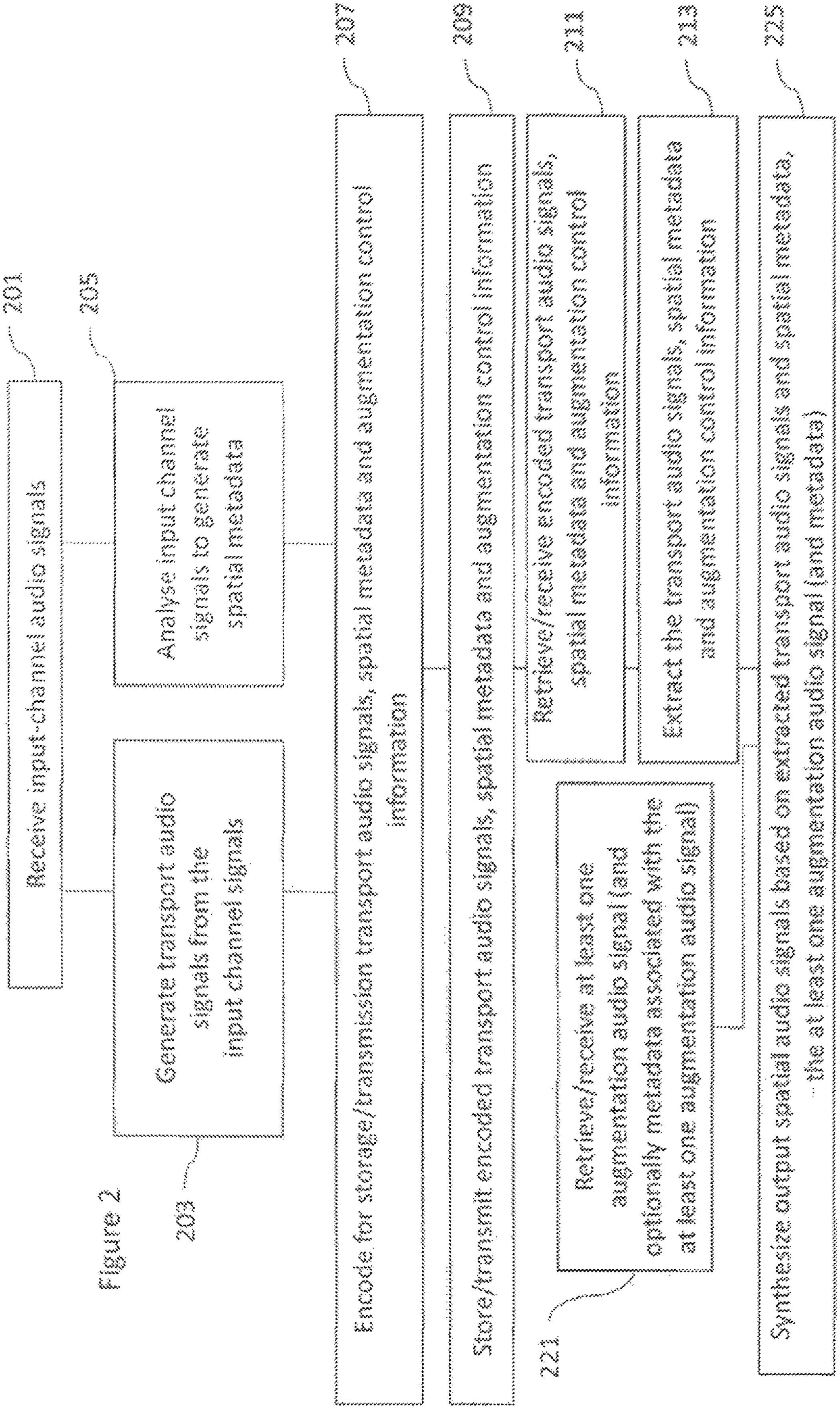
FIG. 2 shows a flow diagram of the operation of the system as shown in FIG. 1 according to some embodiments.

With respect to FIG. 2 an example flow diagram of the overview shown in FIG. 1 is shown.

First the system (analysis part) is configured to receive input audio signals or suitable multichannel input as shown in FIG. 2 by step 201.

Then the system (analysis part) is configured to generate a transport signal channels or transport signals (for example downmix/selection/beamforming based on the multichannel input audio signals) as shown in FIG. 2 by step 203.

Also the system (analysis part) is configured to analyse the audio signals to generate spatial metadata as shown in FIG. 2 by step 205. In other embodiments the spatial metadata may be generated through user or other input or partly through analysis and partly through user or other input.

The system is then configured to (optionally) encode for storage/transmission the transport signals, the spatial metadata and control information as shown in FIG. 2 by step 207.

After this the system may store/transmit the transport signals, spatial metadata and control information as shown in FIG. 2 by step 209.

The system may retrieve/receive the transport signals, spatial metadata and control information as shown in FIG. 2 by step 211.

Then the system is configured to extract the transport signals, spatial metadata and control information as shown in FIG. 2 by step 213.

Furthermore the system may be configured to retrieve/receive at least one augmentation audio signal (and optionally metadata associated with the at least one augmentation audio signal) as shown in FIG. 2 by step 221.

The system (synthesis part) is configured to synthesize an output spatial audio signals (which as discussed earlier may be any suitable output format (such as binaural or multichannel loudspeaker) depending on the use case) based on extracted audio signals, spatial metadata, the at least one augmentation audio signal (and metadata) as shown in FIG. 2 by step 225.

Figure 3:
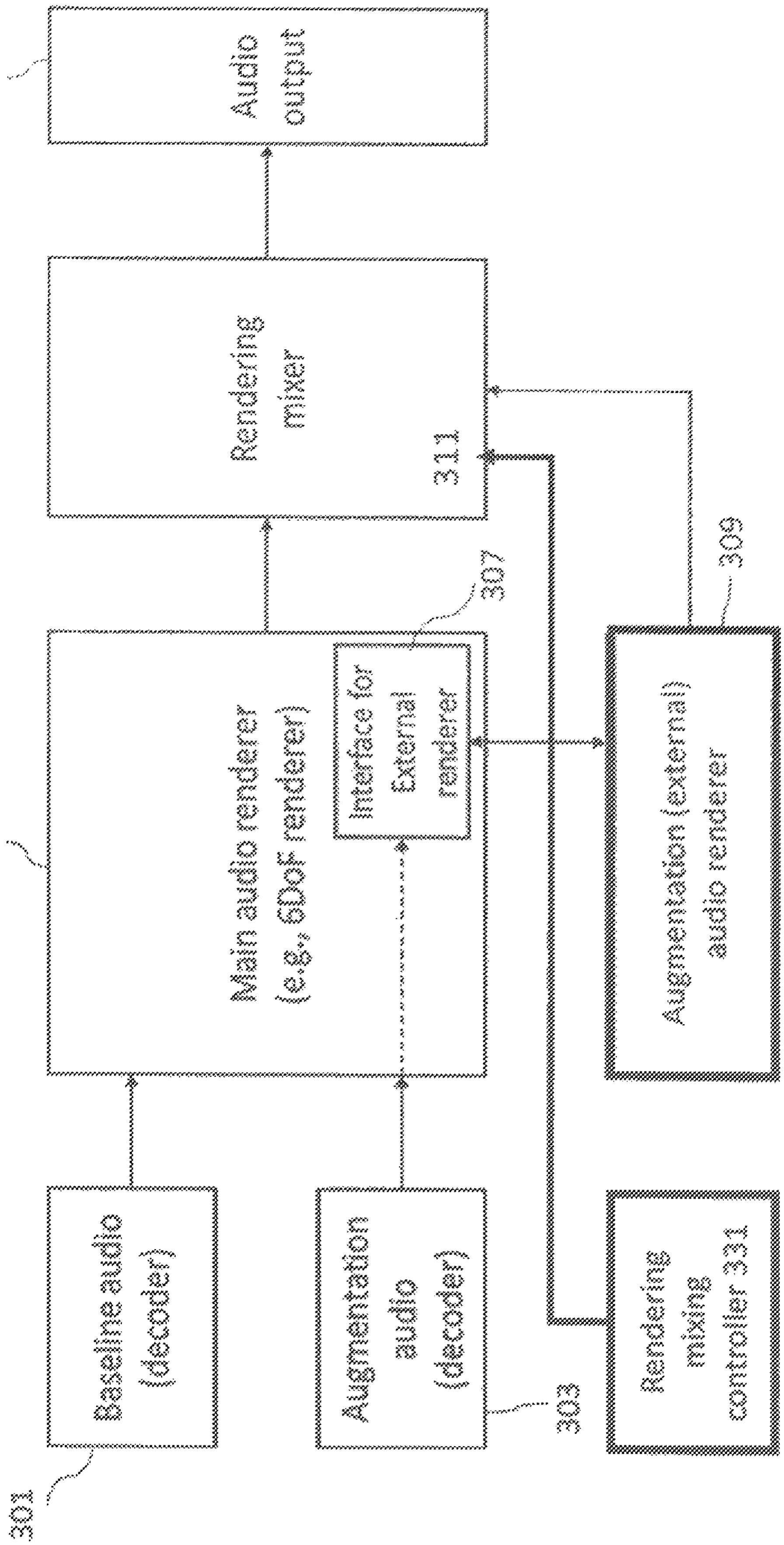
FIG. 3 shows schematically an example synthesis processor apparatus as shown in FIG. 1 suitable for implementing some embodiments.

With respect to FIG. 3 an example synthesis processor is shown according to some embodiments. The synthesis processor in some embodiments comprises a core or spatial audio decoder 301 which is configured to receive an immersive content stream or spatial audio signal bitstream/file. The spatial audio signal bitstream/file may comprise the transport audio signals and spatial metadata. The spatial audio decoder 301 may be configured to output a suitable decoded audio stream, for example a decoded transport audio stream, and pass this to an audio renderer 305.

Furthermore the spatial audio decoder 301 may furthermore generate from the spatial audio signal bitstream/file a suitable spatial metadata stream which is also transmitted to the audio renderer 305.

The example synthesis processor may furthermore comprise an augmentation audio decoder 303. The augmentation audio decoder 303 may be configured to receive the audio augmentation stream comprising audio signals to augment the spatial audio signals, and output decoded augmentation audio signals to the audio renderer 305. The augmentation audio decoder 303 may further be configured to decode from the audio augmentation input any suitable metadata such as spatial metadata indicating a desired or preferred position for spatial positioning of the augmentation audio signals. The spatial metadata associated with the augmentation audio may be passed to the (main) audio renderer 305.

The synthesis processor may comprise a (main) audio renderer 305 configured to receive the decoded spatial audio signals and associated spatial metadata, the augmentation audio signals and the augmentation metadata.

The audio renderer 305 in some embodiments comprises an augmentation renderer interface 307 configured to check the augmentation audio signals and the augmentation metadata and determine whether the augmentation audio signals may be rendered in the audio renderer 305 or to pass the augmentation audio signals and the augmentation metadata to an augmentation (external) renderer 309 which is configured to render into a suitable format the augmentation audio signals and the augmentation metadata.

The audio renderer 305 based on the suitable decoded audio stream and metadata may generate a suitable rendering and pass the audio signals to a rendering mixer 311. In some embodiments the audio renderer 305 comprises any suitable baseline 6DoF decoder/renderer (for example a MPEG-I 6DoF renderer) configured to render the 6DoF audio content according to the user position and rotation.

The audio renderer 305 and the augmentation (external) renderer interface 307 may be configured to output the augmentation audio signals and the augmentation metadata where they are not of a suitable format to be rendered by the main audio renderer to an augmentation renderer (an external renderer for augmentation audio) 309. An example of such a case is when the augmentation metadata contains parametric spatial metadata which the main audio renderer does not support.

The augmentation (or external) renderer 309 may be configured to receive the augmentation audio signals and the augmentation metadata and generate a suitable augmentation rendering which is passed to a rendering mixer 311.

In some embodiments the synthesis processor furthermore comprises a rendering mixing controller 331. The rendering mixing controller 331 is configured to control the mixing of the (main) audio renderer 305 and the augmentation (external) renderer 307.

The rendering mixer 311 having received the output of the audio renderer 305 and the augmentation renderer 309 may be configured to generate a mixed rendering based on the control signals from the rendering mixing controller which may then be output to a suitable output 313.

The suitable output 313 may for example be headphones, a multichannel speaker system or similar.

Figure 4:
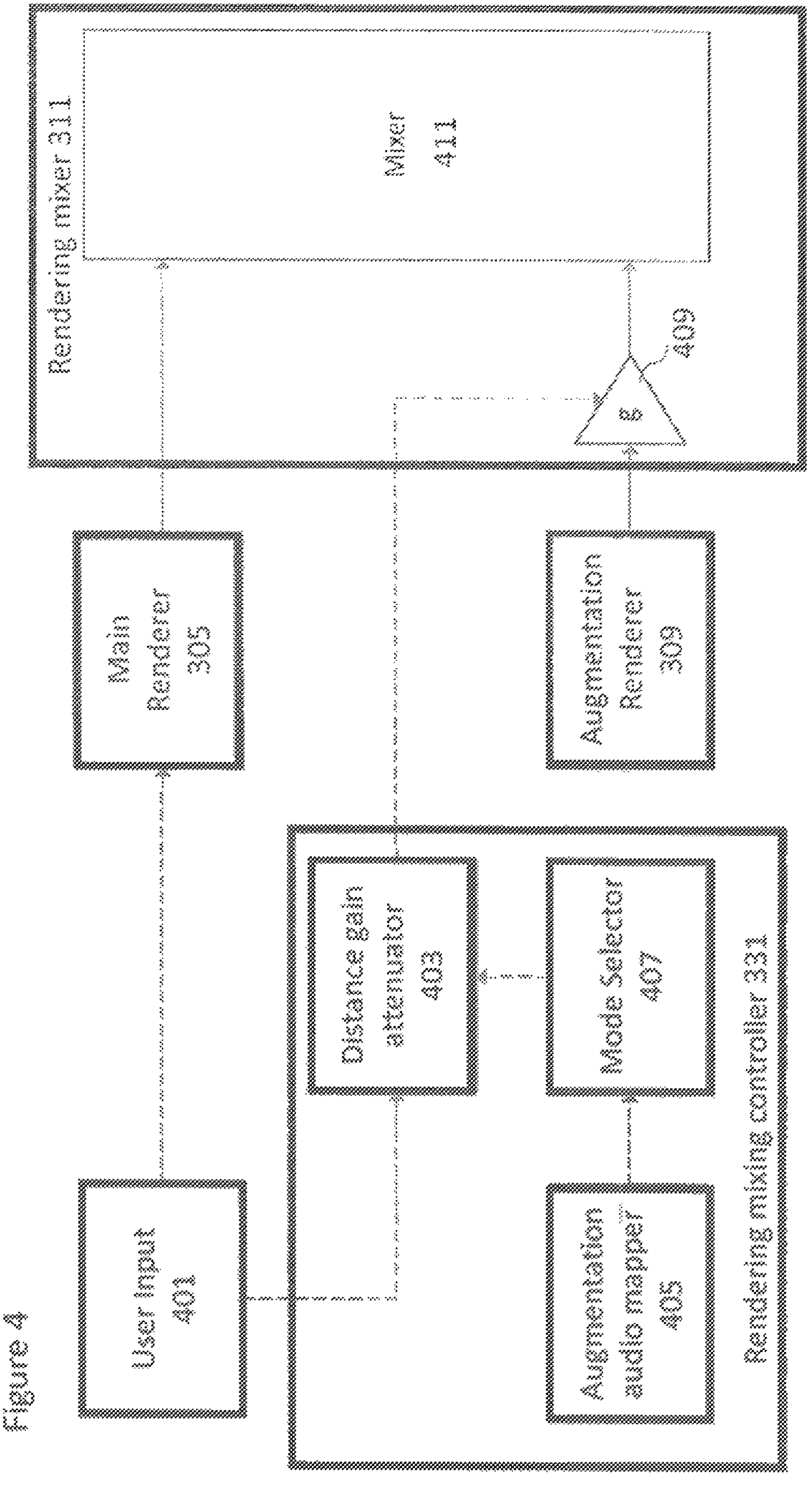
FIG. 4 shows schematically an example rendering mixer and rendering mixing controller as shown in FIG. 3 and suitable for implementing some embodiments.

With respect to FIG. 4 is shown in further detail the rendering mixing controller 331 and rendering mixer 311 in further detail. In this example shown a (main or 6DoF) audio signal is rendered by the main renderer 305 and is passed to the rendering mixer 311. Furthermore the augmentation renderer 309 is configured to render an augmentation audio signal and is also passed to the rendering mixer 311. For example in some embodiments a binaural rendering is obtained from each of the two renderers. Furthermore any suitable method can be used for the rendering. For example in some embodiments a content consumer user may control a suitable user input 401 to provide a user position and rotation (or orientation value) which is input to the main renderer 305 and controls the main renderer 305.

In some embodiments the rendering mixing controller 331 comprises an augmentation audio mapper 405. The augmentation audio mapper 405 is configured to receive suitable metadata associated with the augmentation audio and determine a suitable mapping from the augmentation audio to the main audio scene. The metadata may be received in some embodiments from the augmentation audio or in some embodiments be received from the main audio or in some embodiments be partly based on a user input or a setting provided by the renderer.

For example where the augmentation audio scene is a 3DoF scene/environment and the main audio scene is a 6DoF scene/environment the augmentation audio mapper 405 may be configured to determine that the 3DoF audio is situated somewhere in the 6DoF content (and is not intended to follow the content consumer user, which may be the default characteristics of 3DoF audio treated separately).

This mapping information may then be passed to a mode selector 407.

The rendering mixing controller 331 may furthermore comprise a mode selector 407. The mode selector 407 may be configured to receive the mapping information from the augmentation audio mapper 405 and determine a suitable mode of operation for the mixing. For example the mode selector 407 may be able to determine whether the rendering mixing is a user-locked mode or a world-locked mode. The selected mode may then be passed to a distance gain attenuator 403.

The rendering mixing controller 331 may also comprise a distance gain attenuator 403. The distance gain attenuator 403 may be configured to receive from the mode selector the determined mode of mixing/rendering and furthermore in some embodiments the user position and rotation from the user input 401.

For example when the system is in a world-locked mode a content consumer user position and rotation information also affects the 3DoF audio rendering of any world-locked mode audio. In world-locked mode the augmentation audio mapper mapping of the augmentation to main (3DoF-to-6DoF) scene may be used to control a distance attenuation to be applied to any world-locked (augmentation or 3DoF) content based on the user position (and rotation). The distance gain attenuator 403 can be configured to generate a suitable gain value (based on the user position/rotation) to be applied by a variable gain stage 409 to the augmentation renderer output before mixing with the main renderer output. The gain value may in some embodiments be based on a function based on the user position (and rotation) when in at least a world-locked mode. In some embodiments the function may be provided from at least one of:

metadata associated with the main audio signal;

metadata associated with the augmentation audio signal;

a default value for a standard or a specific implementation; and derived based on a user input or other external control.

When the system is determined to be in a user-locked mode, the augmentation audio (3DoF) content is configured to follow the content consumer user. The rendering of the augmentation content (relative to the main or 6DoF content) may be therefore independent of the user position (and possibly rotation). In such embodiments the distance gain attenuator 403 generates a gain control signal with is independent of the user position/rotation (but may be dependent on other inputs, for example volume control).

In some embodiments the rendering mixer 311 comprises a variable gain stage 409. The variable gain stage 409 is configured to receive a controlling input from the distance gain attenuator 403 to set the gain value. Furthermore in some embodiments the variable gain stage receives the output of the augmentation renderer 309 and applies the controlled gain and outputs to the mixer 411. Although in this example shown in FIG. 4, the variable gain is applied to the output of the augmentation renderer 309 in some embodiments there may be implemented a variable gain stage applied to the output of the main renderer or to both the augmentation and the main renderers.

The rendering mixer 311 in some embodiments comprises a mixer 411 configured to receive the outputs of the variable gain stage 409 which comprises the amplitude modified augmentation rendering and the main renderer 305 and mixes these.

In some embodiments, different types of augmentation audio can be rendered in parallel according to different modes (such as for example user-locked or world-locked mode).

In some embodiments, different types of augmentation audio can be passed to the 6DoF renderer and the 3DoF renderer based on the 6DoF renderer capability. Thus, 3DoF (external) renderer can be used only for audio that the 6DoF renderer is not capable of rendering for example without applying first a format transformation that may affect the perceptual quality of the augmentation audio.

Figure 5:
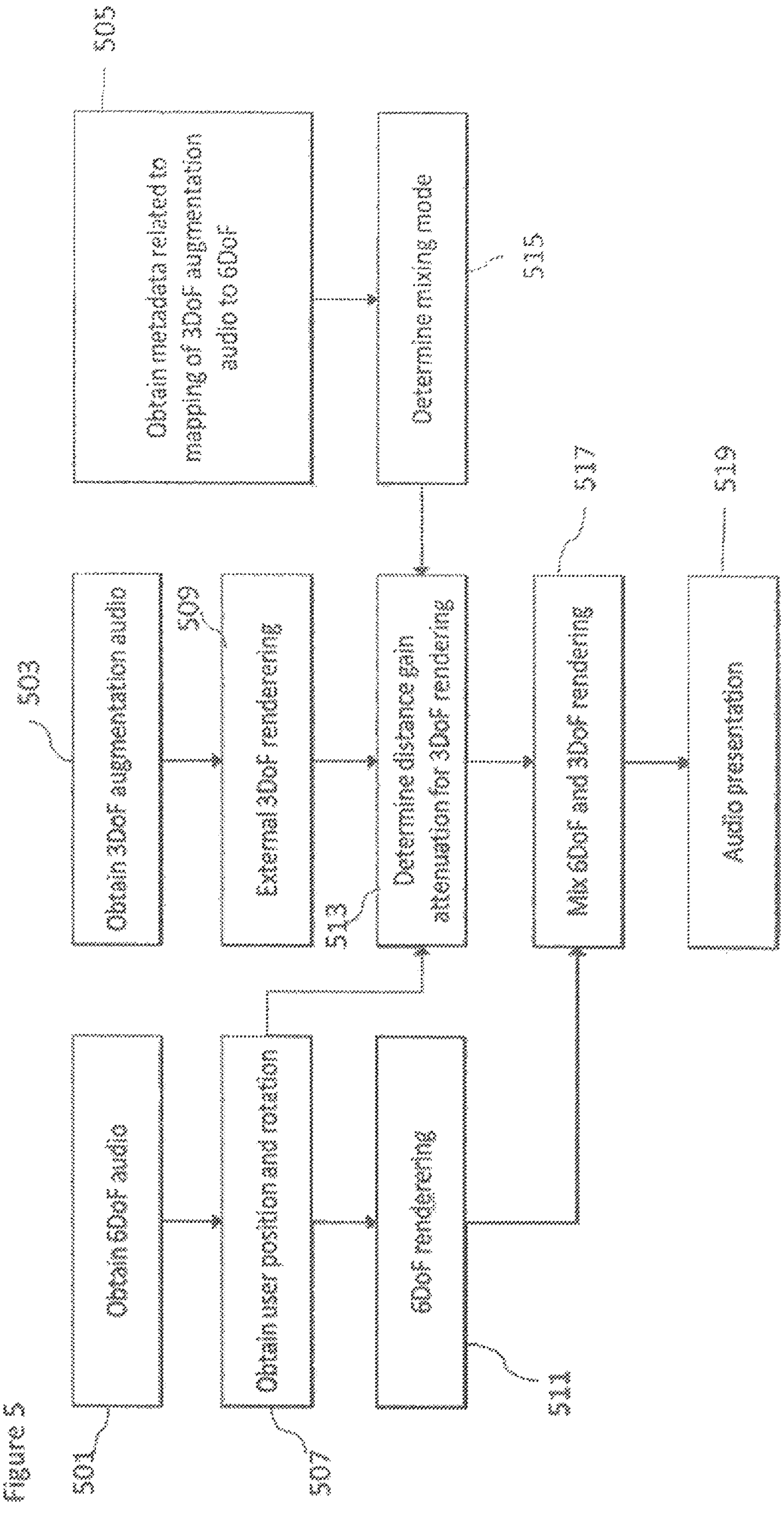
FIG. 5 shows a flow diagram of the operation of the synthesis processor apparatus as shown in FIGS. 3 and 4 according to some embodiments.

With respect to FIG. 5 is shown an example flow diagram of operation of the synthesis processor shown in FIG. 3 and FIG. 4. In this example the rendering operation is one where the (main) audio input is a 6DoF audio spatial audio stream and the augmentation (external) audio input is a 3DoF augmentation audio stream.

The (main) immersive content (for example the 6DoF content) audio (and associated metadata) may be obtained, for example decoded from a received/retrieved media file/stream, as shown in FIG. 5 by step 501.

Having obtained the (main) audio stream in some embodiments the content consumer user position and rotation (or orientation) is obtained as shown in FIG. by step 507.

Furthermore in some embodiments having obtained the user position and rotation the (main) audio stream is rendered (by the main renderer) according to any suitable rendering method as shown in FIG. 5 by step 511.

In some embodiments the augmentation audio (for example the 3DoF augmentation) may be decoded/obtained as shown in FIG. 5 by step 503.

Having obtained the augmentation audio stream the augmentation audio stream is rendered according to any suitable rendering method (and by the external or further renderer) as shown in FIG. 5 by step 509.

Furthermore metadata related to the mapping of 3DoF augmentation audio to the 6DoF scene/environment may be obtained (for example from metadata associated with the augmentation audio content file/stream or in some embodiments from a user input) as shown in FIG. 5 by step 505.

Having obtained the metadata related to the mapping the mixing mode may be determined as shown in FIG. 5 by step 515.

Based on the determined mixing mode and the user position/rotation a distance gain attenuation for the augmentation audio may be determined and applied to the augmentation rendering as shown in FIG. 5 by step 513.

The main and (modified) augmentation renderings are then mixed as shown in FIG. 5 by step 517.

The mixed audio is then presented or output as shown in FIG. 5 by step 519.

In some embodiments the augmentation audio renderer is configured to render a part of the augmentation audio signal. For example in some embodiments the augmentation audio signal may comprise a first part that the main renderer is not able to render effectively and a second and third part that the main renderer is able to render. In some embodiments the first and second part may be passed to the augmentation renderer while the third part is rendered by the main audio renderer. Thus the third part may be rendered to be fully consistent with user movement, the first part may be rendered partially consistent with user movement and the second part can be rendered fully or partially consistent with user movement.

Figure 6:
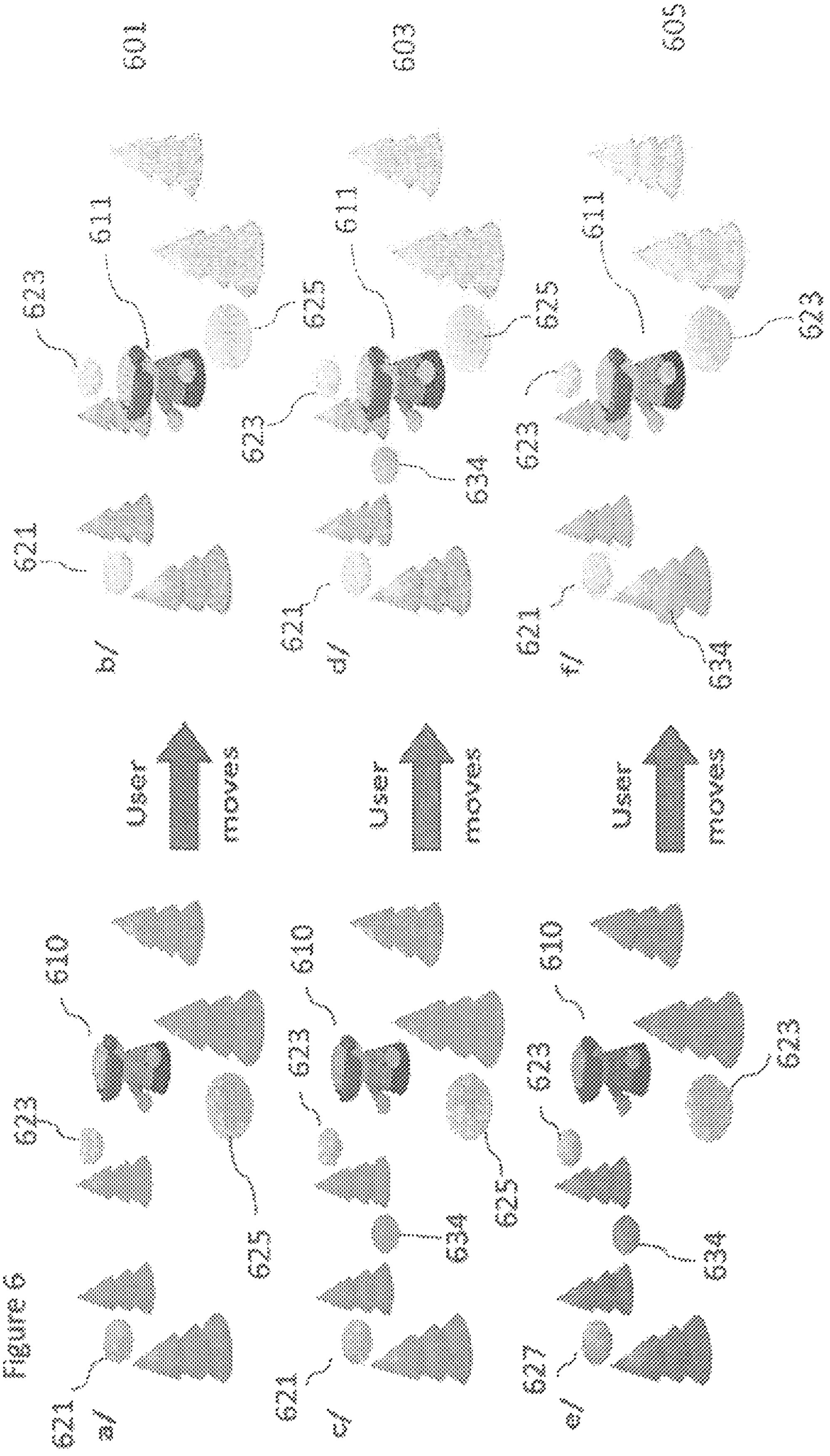
FIGS. 6 to 8 show schematically examples of the effect of the rendering according to some embodiments.
Figure 7:
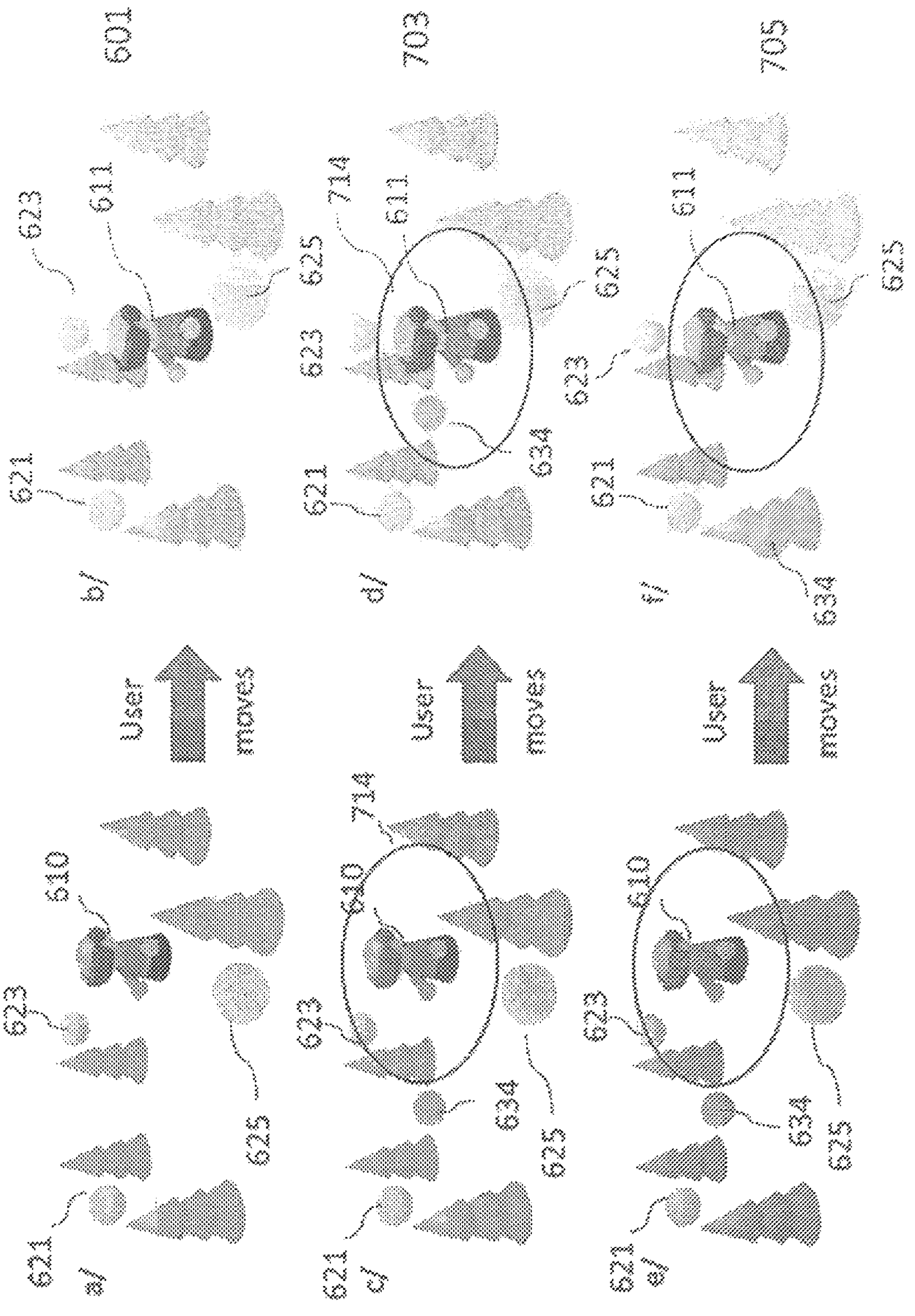
Figure 8:
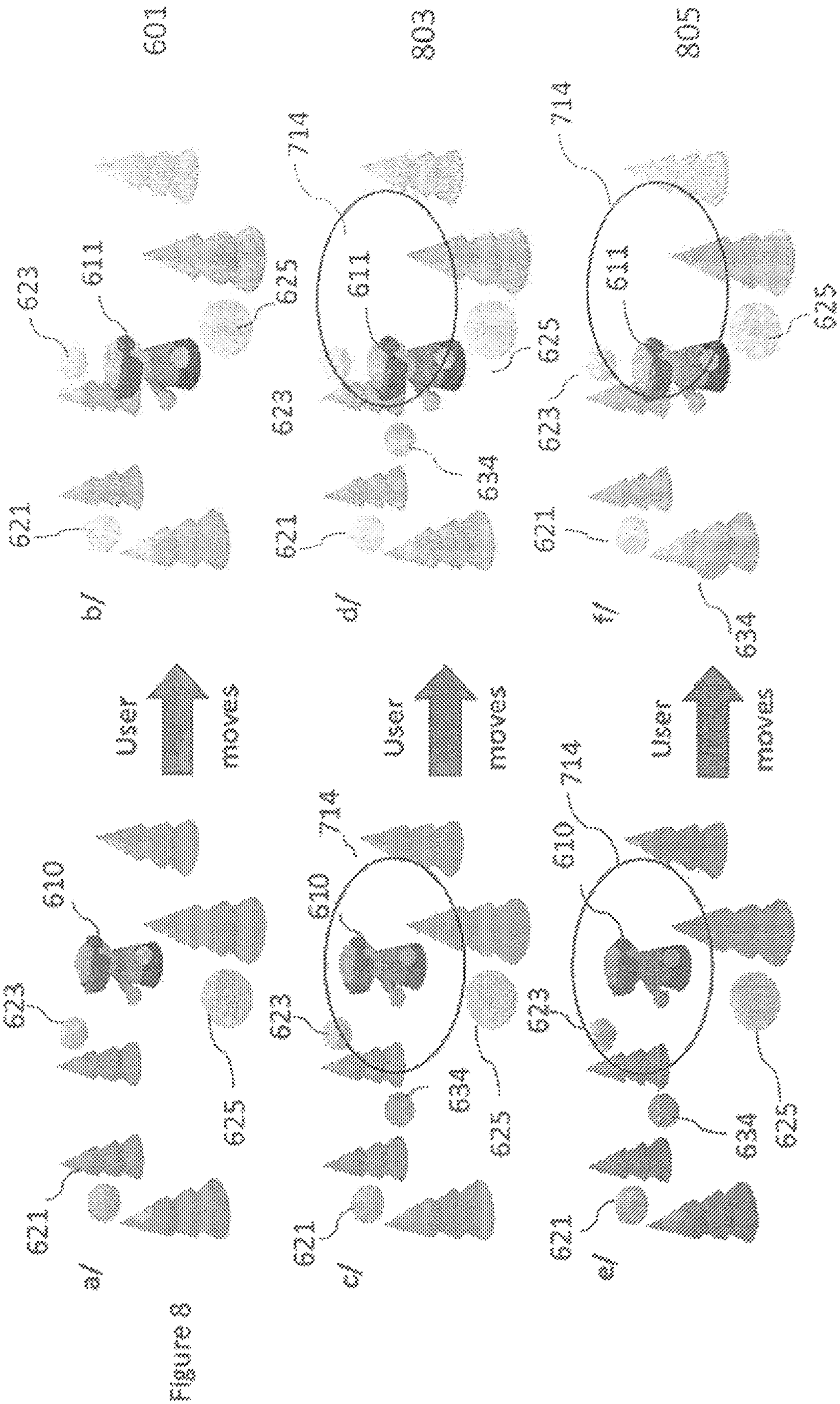

With respect to FIGS. 6 to 8 are shown example scenarios of the effects of mixing the main and the augmentation renderings in known systems and in some embodiments.

The top row 601 of FIG. 6 shows a user moving from a first position 610 to a second position 611 in a 6DoF scene/environment. The scene/environment may include visual content (trees) and sound sources (shown as spheres 621, 623, 625) and which may be located at fixed locations within the scene/environment or move within the scene/environment according to their own properties or at least partly based on the user movement.

A second row 603 of FIG. 6 shows the user moving from a first position 610 to a second position 611 in a 6DoF scene/environment. In this example a further audio source 634, which is world locked, is augmented into the 6DoF rendered scene/environment. The audio source may be low-delay path object-based audio content introduced as the augmentation audio signal. The low-delay path audio source augmentation may be non-spatial content (with additional spatial metadata) or 3DoF spatial content. A typical example for this low-delay path audio is communications audio. While for such audio at least the main component (for example a user voice) should always be audible to the receiving user, it may be that in a world locked mode the user may move so far away from the audio source 634 that it is no longer audible. In some embodiments, there may therefore be implemented a compensation mechanism where the audio source 634 remains audible at least at a given threshold level regardless of the user to audio source distance. The audio source 634 is heard by the user from its relative direction in the 6DoF scene. The user movement as depicted on the second row 603 may increase the sound pressure level of audio source 634 as observed by the user.

A third row 605 of FIG. 6 shows the user moving from a first position 610 to a second position 611 in a 6DoF scene/environment. In this example a further audio source 634 which is user locked is augmented into the 6DoF rendered scene/environment. This user locked audio source 634 maintains at least its relative distance to the user. In some embodiments, it may furthermore maintain its relative rotation (or angle) to the user.

With respect to FIG. 6 the mapping of the 3DoF content to the 6DoF content may be implemented based on control engine input metadata. However, other audio augmentation use cases are also possible. Thus, a sound source may be either world-locked 603 or user-locked 605. A user-locked situation may therefore refer to 3DoF content relative to a 6DoF content, not non-diegetic content. The rendering as shown in the examples in FIG. 6 may generally be implemented in the main audio renderer only, as it is expected all main 6DoF audio renderers are capable of rendering an audio source corresponding to an object-based representation of audio (which may be for example a mono PCM audio signal with at least one spatial metadata parameter such as position in the 6DoF scene).

Spatial augmentation may add the requirement for spatial rendering. In some embodiments the spatial audio may be a format comprising audio signals and associated spatial parameter metadata (for example directions, energy ratios, diffuseness, coherence values of non-directional energy, etc.).

With respect to the examples shown in FIG. 7 the 3DoF or augmented content may be understood as an "audio bubble" 714 and may be considered user-locked relative to the main (6DoF) content. In other words the user can turn or rotate inside the bubble, but cannot walk out of the bubble. The bubble simply follows the user, e.g., for the duration of the immersive call. The audio bubble is shown following the user on rows 703 and 705 that otherwise correspond to rows 603 and 605 of FIG. 6, respectively.

With respect to the examples shown in FIG. 8 the same spatial (3DoF) content is considered world-locked relative to the main (6DoF) content. Thus, the user can walk out of the audio bubble 714. Rows 803 and 805 otherwise correspond to rows 703 and 705 or FIG. 7 (and thus also rows 603 and 605 of FIG. 6), respectively.

The implementations as discussed herein are able to achieve these renderings as the augmentation (external) renderer is a 3DoF renderer and the main (6DoF) renderer (for example a MPEG-I 6DoF Audio Renderer) is unable to process the parametric format. The parametric format may be, e.g., a parametric spatial audio format of a 3GPP IVAS codec, and it may consist of N waveform channels and spatial metadata parameters for time-frequency tiles of the N waveform channels.

Figure 9:
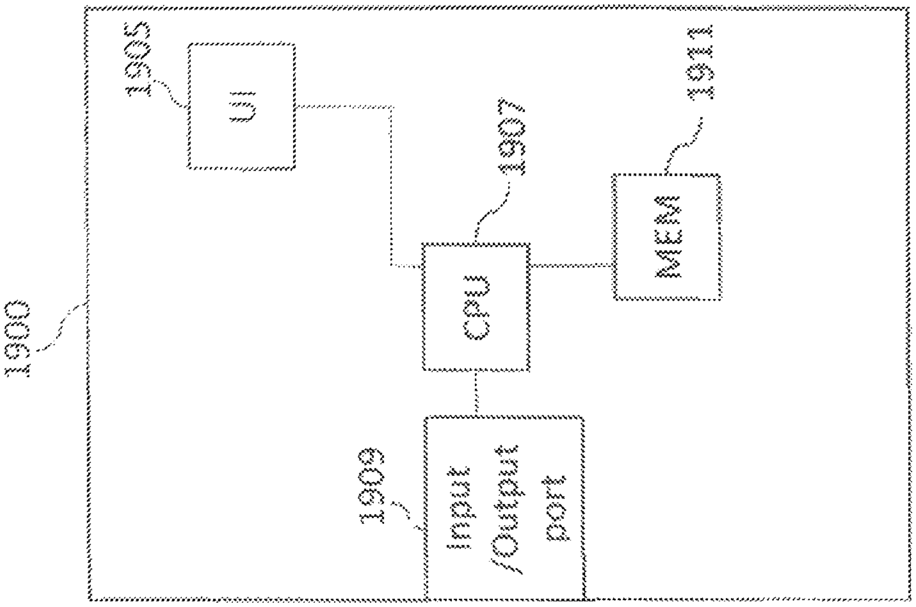
FIG. 9 shows schematically an example device suitable for implementing the apparatus shown.

With respect to FIG. 9 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1900 comprises at least one processor or central processing unit 1907. The processor 1907 can be configured to execute various program codes such as the methods such as described herein.

In some embodiments the device 1900 comprises a memory 1911. In some embodiments the at least one processor 1907 is coupled to the memory 1911. The memory 1911 can be any suitable storage means. In some embodiments the memory 1911 comprises a program code section for storing program codes implementable upon the processor 1907. Furthermore in some embodiments the memory 1911 can further comprise a stored data section for storing data, for example data that has been processed or to be processed in accordance with the embodiments as described herein. The implemented program code stored within the program code section and the data stored within the stored data section can be retrieved by the processor 1907 whenever needed via the memory-processor coupling.

In some embodiments the device 1900 comprises a user interface 1905. The user interface 1905 can be coupled in some embodiments to the processor 1907. In some embodiments the processor 1907 can control the operation of the user interface 1905 and receive inputs from the user interface 1905. In some embodiments the user interface 1905 can enable a user to input commands to the device 1900, for example via a keypad. In some embodiments the user interface 1905 can enable the user to obtain information from the device 1900. For example the user interface 1905 may comprise a display configured to display information from the device 1900 to the user. The user interface 1905 can in some embodiments comprise a touch screen or touch interface capable of both enabling information to be entered to the device 1900 and further displaying information to the user of the device 1900.

In some embodiments the device 1900 comprises an input/output port 1909. The input/output port 1909 in some embodiments comprises a transceiver. The transceiver in such embodiments can be coupled to the processor 1907 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1909 may be configured to receive the loudspeaker signals and in some embodiments determine the parameters as described herein by using the processor 1907 executing suitable code. Furthermore the device may generate a suitable transport signal and parameter output to be transmitted to the synthesis device.

In some embodiments the device 1900 may be employed as at least part of the synthesis device. As such the input/output port 1909 may be configured to receive the transport signals and in some embodiments the parameters determined at the capture device or processing device as described herein, and generate a suitable audio signal format output by using the processor 1907 executing suitable code. The input/output port 1909 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory storing instructions that, when executed with the at least one processor, cause the apparatus at least to:

obtain at least one spatial audio signal configured to be rendered with at least one of a user position or a user orientation;

determine at least one first audio signal based, at least partially, on the at least one spatial audio signal and the at least one of the user position or the user orientation;

obtain at least one augmentation audio signal;

determine at least one second audio signal based, at least partially, on at least a part of the at least one augmentation audio signal; and mix the at least one first audio signal and the at least one second audio signal to generate at least one output audio signal.

2. The apparatus as claimed in claim 1, wherein the at least one spatial audio signal comprising at least one audio signal and at least one spatial parameter associated with the at least one audio signal, wherein the at least one audio signal defines an audio scene, wherein the audio scene comprises at least one audio object, wherein the audio scene comprises a six degrees of freedom audio scene.

3. The apparatus as claimed in claim 2, wherein the at least one first audio signal is further determined based on the at least one spatial parameter.

4. The apparatus as claimed in claim 1, wherein the at least one augmentation audio signal comprises a different audio format than an audio format of the at least one spatial audio signal, wherein the at least one augmentation audio signal provides a different type of media content than the at least one spatial audio signal, wherein the at least one augmentation audio signal comprises at least one of:

three degrees of freedom spatial audio content, non-spatial audio content, low-delay path audio content, or communications audio.

5. The apparatus as claimed in claim 1, wherein the at least one memory stores instructions that, when executed with the at least one processor, cause the apparatus to:

obtain a mapping of a spatial part of the at least one augmentation audio signal to an audio scene; and control the mixing of the at least one first audio signal and the at least one second audio signal based on the mapping.

6. The apparatus as claimed in claim 5, wherein controlling the mixing of the at least one first audio signal and the at least one second audio signal comprises the at least one memory stores instructions that, when executed with the at least one processor, cause the apparatus to:

determine a mixing mode for the mixing of the at least one first audio signal and the at least one second audio signal.

7. The apparatus as claimed in claim 6, wherein the mixing mode is at least one of:

a world-locked mixing mode wherein an audio object associated with the at least one augmentation audio signal is fixed at a position within the audio scene; or an object-locked mixing mode wherein the audio object associated with the at least one augmentation audio signal is fixed relative to the at least one of the user position or the user orientation within the audio scene.

8. The apparatus as claimed in claim 5, wherein controlling the mixing of the at least one first audio signal and the at least one second audio signal comprises the at least one memory stores instructions that, when executed with the at least one processor, cause the apparatus to:

determine a gain based on the at least one of the user position or the user orientation, and a position associated with an audio object associated with the at least one augmentation audio signal; and apply the gain to the at least one second audio signal before mixing the at least one first audio signal and the at least one second audio signal.

9. The apparatus as claimed in claim 5, wherein obtaining the mapping comprises the at least one memory stores instructions that, when executed with the at least one processor, cause the apparatus to at least one of:

decode metadata related to the mapping of the spatial part of the at least one augmentation audio signal to the audio scene based on the at least one augmentation audio signal; or obtain the mapping of the spatial part of the at least one augmentation audio signal to the audio scene based on a user input.

10. The apparatus as claimed in claim 1, wherein a spatial part of the at least one augmentation audio signal defines one of:

a three degrees of freedom scene; or a three degrees of rotational freedom with limited translational freedom scene.

11. A method comprising:

obtaining at least one spatial audio signal configured to be rendered with at least one of a user position or a user orientation;

determining at least one first audio signal based, at least partially, on the at least one spatial audio signal and the at least one of the user position or the user orientation;

obtaining at least one augmentation audio signal;

determining at least one second audio signal based, at least partially, on at least a part of the at least one augmentation audio signal; and mixing the at least one first audio signal and the at least one second audio signal to generate at least one output audio signal.

12. The method as claimed in claim 11, wherein the at least one spatial audio signal comprising at least one audio signal and at least one spatial parameter associated with the at least one audio signal, wherein the at least one audio signal defines an audio scene, wherein the audio scene comprises at least one audio object, wherein the audio scene comprises a six degrees of freedom audio scene.

13. The method as claimed in claim 12, wherein the at least one first audio signal is further determined based on the at least one spatial parameter.

14. The method as claimed in claim 11, wherein the at least one augmentation audio signal comprises a different audio format than an audio format of the at least one spatial audio signal, wherein the at least one augmentation audio signal provides a different type of media content than the at least one spatial audio signal, wherein the at least one augmentation audio signal comprises at least one of:

three degrees of freedom spatial audio content, non-spatial audio content, low-delay path audio content, or communications audio.

15. The method as claimed in claim 11, further comprising:

obtaining a mapping of a spatial part of the at least one augmentation audio signal to an audio scene; and controlling the mixing of the at least one first audio signal and the at least one second audio signal based on the mapping.

16. The method as claimed in claim 15, wherein controlling the mixing of the at least one first audio signal and the at least one second audio signal comprises:

determining a mixing mode for the mixing of the at least one first audio signal and the at least one second audio signal.

17. The method as claimed in claim 16, wherein the mixing mode is at least one of:

a world-locked mixing mode wherein an audio object associated with the at least one augmentation audio signal is fixed at a position within the audio scene; or an object-locked mixing mode wherein the audio object associated with the at least one augmentation audio signal is fixed relative to the at least one of the user position or the user orientation within the audio scene.

18. The method as claimed in claim 15, wherein controlling the mixing of the at least one first audio signal and the at least one second audio signal comprises:

determining a gain based on the at least one of the user position or the user orientation, and a position associated with an audio object associated with the at least one augmentation audio signal; and applying the gain to the at least one second audio signal before mixing the at least one first audio signal and the at least one second audio signal.

19. The method as claimed in claim 15, wherein obtaining the mapping comprises at least one of:

decoding metadata related to the mapping of the spatial part of the at least one augmentation audio signal to the audio scene based on the at least one augmentation audio signal; or obtaining the mapping of the spatial part of the at least one augmentation audio signal to the audio scene based on a user input.

20. A non-transitory computer-readable medium comprising program instructions stored thereon for performing at least the following:

causing obtaining of at least one spatial audio signal configured to be rendered with at least one of a user position or a user orientation;

determining the at least one first audio signal based, at least partially, on the at least one spatial audio signal and the at least one of the user position or the user orientation;

causing obtaining of at least one augmentation audio signal;

determining at least one second audio signal based, at least partially, on at least a part of the at least one augmentation audio signal; and mixing the at least one first audio signal and the at least one second audio signal to generate at least one output audio signal.

* * * * *